UNITED STATES PATENT OFFICE.

HEINRICH HACKL AND HUGO BUNZEL, OF HEUFELD, GERMANY.

PROCESS OF ELIMINATING IRON FROM LIQUIDS.

1,100,675. Specification of Letters Patent. Patented June 16, 1914.

No Drawing. Application filed May 27, 1913. Serial No. 770,228.

*To all whom it may concern:*

Be it known that we, HEINRICH HACKL, a subject of the Emperor of Austria-Hungary, and HUGO BUNZEL, a subject of the Emperor of Germany, and residing both at Heufeld, Upper Bavaria, Germany, have invented certain new and useful Improvements in Processes of Eliminating Iron from Liquids; and we do hereby declare the following to be a full, clear, and exact description of the invention, of which the following is a specification.

The processes used industrially for separating iron present as a ferrous salt in solution comprise in the first place an oxidation of the iron by one of various oxidizing agents, such as chlorin, nitric acid, hypochlorites, chlorates, peroxids, salts of peracids and so on, or by atmospheric air, which latter is sometimes ozonized to effect a more rapid action.

With the exception of atmospheric oxygen which is absorbed, the oxidizing substances are reduced in the oxidation process, and therefore destroyed without the possibility of regeneration. In the case of oxidation with air it is necessary to pass very large quantities of air through the liquids, best with the aid of heat, and in spite of this, even when bases have been added, the reaction takes place so sluggishly that use can be made of this process only seldom. On the contrary cuprous compounds such as a solution of cuprous chlorid in sodium chlorid or other chlorids, particularly in the presence of any base, in contrast to the ferrous compounds, oxidize very rapidly to basic cupric compounds which separate out from the liquid in accordance with the following reaction:

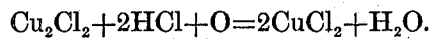
$$Cu_2Cl_2 + 2HCl + O = 2CuCl_2 + H_2O.$$

It is known that ferrous salt solutions are changed by cupric compounds, especially in the presence of a base, into ferric compounds, while the cupric compound is thereby reduced to cuprous condition.

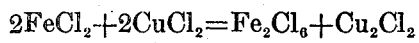
$$2FeCl_2 + 2CuCl_2 = Fe_2Cl_6 + Cu_2Cl_2$$

The combination of these two reactions into a single process for the purpose of separating the iron has not been known hitherto and by its use a new technical effect is attained, as will be shown by the following examples; this effect can be attained economically only by the use of copper salts, (especially the chlorid,) but not by any of the oxidizing agents heretofore used and above mentioned. As the carrying out of the two reactions can be effected not only successively but also simultaneously and in the same bath, the use of copper compounds for separating iron is characterized as a contact action for conveying atmospheric oxygen to ferrous oxid salts. This contact action also permits the use of copper compounds for removing the iron from potable and industrial waters, in which case at the same time a sterilizing action is obtained, as the copper goes into solution temporarily.

The following examples serve to show the various possibilities of the use of this process:

Example 1: The liquor containing zinc and copper as it comes from the chloridizing roasting of copper pyrites is at present almost exclusively subjected to cementation with iron for obtaining copper, which iron goes into solution, thereby precipitating the copper. The zinc solution, strongly impregnated with iron resulting in this case, has not as yet been economically further treated for its zinc, for the reason that the iron present in the form of ferrous compounds has required too great consumption of oxidizing agents. The copper containing residues from burnt pyrites are roasted with salt, for the purpose of obtaining the copper, then leached out by water, and the copper is obtained by digesting with iron (cementation). The liquors then remaining constitute a liquor which is troublesome, since it is not generally permissible to run it into streams, the waters of which are to be used and it has not heretofore been possible to properly purify it. Experiments made for recovering the values contained in the liquid from which the copper has been removed, to wit, sodium sulfate and zinc, had always failed, while the removing of the contents of iron, which is principally in the form of ferrous compound, was too expensive on account of the high cost of oxidizing substances and of the losses of valuable material.

The new process hinges on the use of air. If one treats the iron containing liquors with air only its oxidation can be brought about it is true, as soon as a base is present, but, however, the oxidation proceeds so slowly that from a practical standpoint it cannot generally be used. If, on the contrary, a copper compound be added in small amount to the liquor, this will, if a cupric compound, give up its oxygen to the iron, whereby the copper is reduced to a cuprous compound. This cuprous compound will accordingly better absorb the oxygen from the air than the ferrous compound will do. It then immediately becomes again a cupric compound which delivers its oxygen in nascent state to the ferrous salts, so that during the entire period of the carrying out of the oxidation process, the copper is present as cuprous compounds, as it can be proved. Hence, one recognizes the copper as a contact body for carrying over oxygen. The use of the copper characterizes our process accordingly as a contact process, in which two oxidizing reactions are separated from each other, but follow each other very closely, and an amount of copper equivalent to the amount of iron may be added to the liquor. The precipitation of the iron may be effected by the action of a base, for example, most cheaply by means of chalk, whereby the resulting gypsum aids in the following filtration of the iron precipitate. According to the above, the iron must be combined with the same amount of oxygen from the air, whether or not the copper is present equivalent to the iron, or equal to only a small part thereof.

The following example illustrates our invention. In this process the copper is preferably present in small amount only, since the losses of copper are much less, if a small amount only of copper is present, than when large amounts are used. These losses are probably due to the absorption or occlusion in the iron precipitates, of a portion of the copper present in the solution, which copper may not be completely redissolved or removed from the precipitate by treating the same with a further quantity of the waste liquor. To the waste liquor from the separation of the copper, (before or after the removal therefrom of sodium sulfate) is added, in suitable form, an amount of copper, equal to $\frac{1}{5}$ of the amount of iron in said liquor, (the liquor before cementation may be used for this or even the liquor after cementation since the latter is not complete) and the whole of the copper and iron in said mixture is precipitated by means of chalk, or the like. It is not necessary that the liquor be heated to boiling, since the reaction will take place at ordinary temperatures. It is thereupon treated with air with or without pressure or by agitation, whereby the iron is transformed quickly into ferric hydroxid, mixed together with gypsum, while the copper present remains as cuprous compounds in solution until all the iron has been oxidized. Then on further treatment with air the copper becomes an oxid compound and is finally completely precipitated by chalk. The precipitate of iron and copper as hydroxids mixed with gypsum may then be separated from the iron-free and copper-free liquor, which liquor can be further treated to recover its remaining values. The precipitate will be treated with a further amount of the liquors from copper cementation, which contain iron as ferrous compounds whereby the copper easily is dissolved out from the excess of iron and goes into solution as compounds of the lower oxid (cuprous), whereby the corresponding amount of iron in the liquor will be oxidized. Now the iron precipitate free from copper will be filtered out, whereupon the copper in the liquor, after the addition of the necessary amount of chalk is again subjected to the treatment with air. Accordingly the small amount of copper added in the beginning always remains in cyclic circulation in the process, while new quantities of iron are always obtained upon separation.

Example 2: Zinc coating and iron drawing plants have great difficulty with the disposal of their pickle liquors containing ferrous chlorid and ferrous sulfate. Purified according to the present process these latter can be made harmless so that they can be carried off into the sewers, because the iron is separated out as an oxid compound in a form easily filterable. Precipitated under suitable conditions, this precipitate furnishes a valuable material for making ferric oxid pigments. The copper used goes back into the process for purifying new liquor.

Example 3: Separation of the iron from potable and industrial waters may be practised according to the same manner but in consequence of the comparatively small iron content on the one hand and of the air dissolved in the water on the other, the method of carrying it out undergoes a modification in this way, that the water is advantageously treated with basic copper carbonate, for instance; in which case the iron is oxidized and separated out without the use of any other base and the cupric compound is regenerated by the oxygen dissolved in the water. In this case, traces of the copper go into the solution temporarily, sufficient to kill any germs contained in the water. Finely divided carbonate of lime (which may have arisen from the bicarbonate of calcium dissolved in the water) precipitates all the copper again. It is of advantage to filter the water so obtained through a layer of carbonate of calcium which will hold back all the copper.

We call particular attention to the fact that so far as we are aware it is only those salts of copper which are capable of existing both as cuprous and as cupric compounds, for example the chlorids, which are suitable for use as catalyzers in the present process. The sulfate of copper does not operate in this manner, since cuprous sulfate is not formed under the conditions described in this process, and in case the liquids to be treated contain only sulfates of the metals, then a sufficient amount of chlorids, such as sodium chlorid should be added, before treating the liquid with air.

We claim as our invention:—

1. A process of recovering values from a solution containing ferrous salts, zinc salts, and sodium sulfate, a part at least of said zinc and iron salts being in the form of chlorids, which comprises adding thereto a relatively small amount of a copper compound, blowing air through said liquor until the oxidation of the iron and copper compounds is substantially complete, a compound capable of neutralizing acid being present in the liquor during the oxidation of the iron.

2. A process of recovering values from a solution containing ferrous salts, zinc salts, and sodium sulfate, a part at least of said zinc and iron salts being in the form of chlorids, which comprises adding thereto a relatively small amount of a copper compound, blowing air through said liquor until the oxidation of the iron and copper compounds is substantially complete, and a compound capable of neutralizing acid being present in the liquor during the oxidation of the iron, separating the precipitate from the liquor, and treating the precipitate with a further amount of said liquor containing ferrous compounds.

In testimony whereof we have signed our names to this specification, in the presence of two subscribing witnesses.

HEINRICH HACKL.
Dr. HUGO BUNZEL.

Witnesses:
A. V. W. COYLE,
JOHANNA STERN.